United States Patent
Suzuki et al.

(10) Patent No.: US 11,703,389 B2
(45) Date of Patent: *Jul. 18, 2023

(54) LIGHT MEASUREMENT DEVICE AND LIGHT MEASUREMENT METHOD

(71) Applicant: HAMAMATSU PHOTONICS K.K., Hamamatsu (JP)

(72) Inventors: Kengo Suzuki, Hamamatsu (JP); Shigeru Eura, Hamamatsu (JP); Kazuya Iguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/963,064

(22) PCT Filed: Oct. 10, 2018

(86) PCT No.: PCT/JP2018/037784
§ 371 (c)(1),
(2) Date: Jul. 17, 2020

(87) PCT Pub. No.: WO2019/146173
PCT Pub. Date: Aug. 1, 2019

(65) Prior Publication Data
US 2020/0348178 A1    Nov. 5, 2020

(30) Foreign Application Priority Data
Jan. 23, 2018    (JP) .............................. JP2018-009048

(51) Int. Cl.
*G01J 3/443* (2006.01)
*G01N 21/63* (2006.01)
(52) U.S. Cl.
CPC .............. *G01J 3/443* (2013.01); *G01N 21/63* (2013.01)

(58) Field of Classification Search
None
See application file for complete search history.

(56) References Cited

U.S. PATENT DOCUMENTS

| 8,525,989 B2 | 9/2013 | Iguchi et al. |
| 2002/0024664 A1 | 2/2002 | Yokota et al. |

(Continued)

FOREIGN PATENT DOCUMENTS

| CN | 2537010 Y | 2/2003 |
| CN | 102706837 A | 10/2012 |

(Continued)

OTHER PUBLICATIONS

International Preliminary Report on Patentability dated Aug. 6, 2020 for PCT/JP2018/037784.

(Continued)

*Primary Examiner* — Rufus L Phillips
(74) *Attorney, Agent, or Firm* — Faegre Drinker Biddle & Reath LLP

(57) ABSTRACT

A spectrometry device includes a light source, an integrator configured to have an internal space in which a long afterglow emission material is disposed and output detection light from the internal space, a spectroscopic detector, an analysis unit configured to analyze a photoluminescence quantum yield of the long afterglow emission material, and a control unit configured to control switching between presence and absence of input of excitation light to the internal space and an exposure time in the spectroscopic detector. The control unit controls the light source so that the input of the excitation light to the internal space is maintained in a first period and the input of the excitation light to the internal space is stopped in a second period, and controls (Continued)

the spectroscopic detector so that an exposure time in the second period becomes longer than an exposure time in the first period.

2 Claims, 7 Drawing Sheets

(56) References Cited

U.S. PATENT DOCUMENTS

| | | | | |
|---|---|---|---|---|
| 2002/0192808 | A1* | 12/2002 | Gambini | G01N 21/6452 435/287.2 |
| 2010/0214632 | A1 | 8/2010 | Ikari et al. | |
| 2011/0115897 | A1* | 5/2011 | Najmabadi | G01N 21/64 348/79 |
| 2011/0121200 | A1* | 5/2011 | Watanabe | G01J 3/10 250/458.1 |
| 2014/0161369 | A1* | 6/2014 | Ishihara | A61B 1/00009 382/274 |
| 2014/0203173 | A1* | 7/2014 | Krufka | G01N 21/645 250/214 R |

FOREIGN PATENT DOCUMENTS

| | | | | |
|---|---|---|---|---|
| CN | 105891163 | A * | 8/2016 | |
| CN | 106461558 | A | 2/2017 | |
| CN | 106883163 | A * | 6/2017 | ........... C07D 209/82 |
| CN | 107003183 | A | 8/2017 | |
| CN | 107003243 | A | 8/2017 | |
| CN | 107155073 | A | 9/2017 | |
| JP | S60-242344 | A | 12/1985 | |
| JP | H06-050286 | B2 | 6/1994 | |
| JP | H08-136458 | A | 5/1996 | |
| JP | 2002-542482 | A | 12/2002 | |
| JP | 2006-266810 | A | 10/2006 | |
| JP | 2006-266810 | A | 10/2006 | |
| JP | 2008-032440 | A | 2/2008 | |
| JP | 2009-074866 | A | 4/2009 | |
| JP | 2010-008362 | A | 1/2010 | |
| JP | 2010-151632 | A | 7/2010 | |
| JP | 2011-133370 | A | 7/2011 | |
| JP | 2011-196735 | A | 10/2011 | |
| JP | 2014-149194 | A | 8/2014 | |
| JP | 2016-109432 | A | 6/2016 | |
| TW | M259906 | U | 3/2005 | |
| TW | I613422 | B | 2/2018 | |
| WO | WO-00/063680 | A1 | 10/2000 | |
| WO | WO-2016088574 | A1 * | 6/2016 | ........... G01J 3/0254 |
| WO | WO-2018007444 | A1 * | 1/2018 | ................ G01J 1/16 |

OTHER PUBLICATIONS

Kabe, Ryota et al., "Organic long persistent luminescence," Nature, Oct. 2, 2017, vol. 550, pp. 384-387.

* cited by examiner

LIGHT MEASUREMENT DEVICE AND LIGHT MEASUREMENT METHOD

TECHNICAL FIELD

The present disclosure relates to a light measurement device and a light measurement method.

BACKGROUND ART

As an object to be measured by a spectrometry device, a long afterglow emission material such as a luminescent material or a phosphorescent material has attracted attention. Such a long afterglow emission material is, for example, a material that accumulates sunlight or excitation light of a fluorescent lamp or the like, and sustains light emission for a constant period of time even after radiation of the excitation light is stopped. In recent years, Non-Patent Literature 1 has reported the world's first organic luminescent material that does not contain rare-earth elements. This organic luminescent material realizes an emission lifetime of an hour or more under room temperature conditions by the mixing of two kinds of organic materials. In view of such circumstances, applied research of a long afterglow emission material in various fields such as safety displays, guidance signs, clock faces, lifesaving equipment, interior design, or cell imaging is expected to progress increasingly actively in the future.

CITATION LIST

Non-Patent Literature

[Non-Patent Literature 1] Nature, 2017, doi:10. 1038/nature 24010, R. Kabe and C. Adachi

SUMMARY OF INVENTION

Technical Problem

One evaluation item of a light-emitting material includes a photoluminescence quantum yield. The photoluminescence quantum yield is a value indicating the light emission efficiency of a light-emitting material. The photoluminescence quantum yield is calculated by dividing the number of photons emitted from a light-emitting material by the number of photons absorbed into the light-emitting material. However, there is a problem in that the intensity of light emission in the above-described long afterglow emission material is extremely weaker than the intensity of excitation light, and that the intensity of light emission after the radiation of the excitation light is stopped fluctuates over time. For this reason, it was difficult to measure the photoluminescence quantum yield with a good degree of accuracy in existing methods.

The present disclosure was contrived in order to solve the above problem, and an object thereof is to provide a spectrometry device and a spectrometry method that make it possible to measure the photoluminescence quantum yield of a long afterglow emission material with a good degree of accuracy.

Solution to Problem

According to an aspect of the present disclosure, there is provided a spectrometry device configured to irradiate a long afterglow emission material with excitation light and measure a photoluminescence quantum yield, the device including: a light source configured to output the excitation light; an integrator configured to have an internal space in which the long afterglow emission material is disposed, and output light from the internal space as detection light; a spectroscopic detector configured to spectroscopically disperse the detection light and acquire spectral data; an analysis unit configured to analyze the photoluminescence quantum yield of the long afterglow emission material on the basis of the spectral data; and a control unit configured to control switching between presence and absence of input of the excitation light to the internal space and an exposure time of the detection light in the spectroscopic detector, wherein the control unit controls the light source so that the input of the excitation light to the internal space is maintained in a first period in which the acquisition of the spectral data through the spectroscopic detector is started, and that the input of the excitation light to the internal space is stopped in a second period subsequent to the first period, and controls the spectroscopic detector so that an exposure time of the detection light in the second period becomes longer than an exposure time of the detection light in the first period.

In this spectrometry device, the excitation light is continuously input to the long afterglow emission material within the integrator in the first period in which the acquisition of the spectral data is started. The intensity of the excitation light is extremely higher than the intensity of light emission in the long afterglow emission material. For this reason, the exposure time of the detection light in the first period is made shorter than the exposure time of the detection light in the second period, whereby it is possible to prevent the saturation of a signal in the spectroscopic detector. In addition, in this spectrometry device, the input of the excitation light to the long afterglow emission material within the integrator is stopped in the second period subsequent to the first period, and the exposure time of the detection light in the second period is made longer than the exposure time of the detection light in the first period. Thereby, light emission of the long afterglow emission material in which its intensity is extremely lower than the excitation light and the intensity fluctuates over time after the input of the excitation light is stopped can be detected with a sufficient S/N ratio. Therefore, in this spectrometry device, it is possible to measure the photoluminescence quantum yield of the long afterglow emission material with a good degree of accuracy. In addition, the exposure time of the detection light in the second period is made longer than the exposure time of the detection light in the first period, so that even in a case where the emission lifetime of the long afterglow emission material is long, it is possible to suppress an increase in the amount of data required for the acquisition of spectral data.

In addition, the control unit may control the spectroscopic detector so that an exposure time of the detection light becomes longer after an elapse of a certain period of time from start of the second period. In this case, it is possible to more suitably suppress an increase in the amount of data required for the acquisition of the spectral data.

In addition, the spectroscopic detector may acquire a peak value of an intensity of the excitation light in the first period and a peak value of an intensity of light emission in the long afterglow emission material on the basis of the spectral data, and the control unit may determine an exposure time of the detection light during start of the second period on the basis of a product of a ratio of the peak value of the intensity of the excitation light to the peak value of the intensity of light emission and the exposure time of the detection light in the first period. By using such a ratio, it is possible to optimize the exposure time of the detection light during the start of the second period, and to prevent the saturation of a signal in the spectroscopic detector in the second period.

In addition, the analysis unit may analyze a time profile of an intensity of light emission in the long afterglow emission material by standardizing the intensity of light emission in the long afterglow emission material in the first period on the basis of the exposure time of the detection light in the first period, and standardizing the intensity of light emission in the long afterglow emission material in the second period on the basis of the exposure time of the detection light in the second period. Thereby, even in a case where the exposure time is dynamically changed during a measurement period, it is possible to analyze the time profile of the intensity of light emission in the long afterglow emission material with a good degree of accuracy.

In addition, the integrator may be an integration hemisphere. Even in a case where an integration hemisphere is used as the integrator, it is possible to measure the photoluminescence quantum yield of the long afterglow emission material with a good degree of accuracy.

According to an aspect of the present disclosure, there is provided a spectrometry method of irradiating a long afterglow emission material with excitation light and measuring a photoluminescence quantum yield, the method including: a spectral data acquisition step of spectroscopically dispersing detection light, output from an integrator having an internal space in which the long afterglow emission material is disposed, through a spectroscopic detector and acquiring spectral data; and a photoluminescence quantum yield analysis step of analyzing the photoluminescence quantum yield of the long afterglow emission material on the basis of the spectral data, wherein, in the spectral data acquisition step, input of the excitation light to the internal space is maintained in a first period in which the acquisition of the spectral data through the spectroscopic detector is started, and the input of the excitation light to the internal space is stopped in a second period subsequent to the first period, and an exposure time of the detection light in the second period in the spectroscopic detector is made longer than an exposure time of the detection light in the first period.

In this spectrometry method, the excitation light is continuously input to the long afterglow emission material within the integrator in the first period in which the acquisition of the spectral data is started. The intensity of the excitation light is extremely higher than the intensity of light emission in the long afterglow emission material. For this reason, the exposure time of the detection light in the first period is made shorter than the exposure time of the detection light in the second period, whereby it is possible to prevent the saturation of a signal in the spectroscopic detector. In addition, in this spectrometry device, the input of the excitation light to the long afterglow emission material within the integrator is stopped in the second period subsequent to the first period, and the exposure time of the detection light in the second period is made longer than the exposure time of the detection light in the first period. Thereby, light emission of the long afterglow emission material in which its intensity is extremely lower than the excitation light and the intensity fluctuates over time after the input of the excitation light is stopped can be detected with a sufficient S/N ratio. Therefore, in this spectrometry method, it is possible to measure the photoluminescence quantum yield of the long afterglow emission material with a good degree of accuracy. The exposure time of the detection light in the second period is made longer than the exposure time of the detection light in the first period, so that even in a case where the emission lifetime of the long afterglow emission material is long, it is possible to suppress an increase in the amount of data required for the acquisition of spectral data.

In addition, in the spectral data acquisition step, an exposure time of the detection light in the spectroscopic detector may be made longer after an elapse of a certain period of time from start of the second period. In this case, it is possible to more suitably suppress an increase in the amount of data required for the acquisition of the spectral data.

In addition, the spectrometry method may further include a peak acquisition step of acquiring a peak value of an intensity of the excitation light in the first period and a peak value of an intensity of light emission in the long afterglow emission material on the basis of the spectral data, and in the spectral data acquisition step, an exposure time of the detection light during start of the second period may be determined on the basis of a product of a ratio of the peak value of the intensity of the excitation light to the peak value of the intensity of light emission and the exposure time of the detection light in the first period. By using such a ratio, it is possible to optimize the exposure time of the detection light during the start of the second period, and to prevent the saturation of a signal in the spectroscopic detector in the second period.

In addition, in the photoluminescence quantum yield analysis step, a time profile of an intensity of light emission in the long afterglow emission material may be analyzed by standardizing the intensity of light emission in the long afterglow emission material in the first period on the basis of the exposure time of the detection light in the first period, and standardizing the intensity of light emission in the long afterglow emission material in the second period on the basis of the exposure time of the detection light in the second period. Thereby, even in a case where the exposure time is dynamically changed during a measurement period, it is possible to analyze the time profile of the intensity of light emission in the long afterglow emission material with a good degree of accuracy.

In addition, an integration hemisphere may be used as the integrator. Even in a case where an integration hemisphere is used as the integrator, it is possible to measure the photoluminescence quantum yield of the long afterglow emission material with a good degree of accuracy.

Advantageous Effects of Invention

According to the present disclosure, it is possible to measure the photoluminescence quantum yield of a long afterglow emission material with a good degree of accuracy.

DESCRIPTION OF EMBODIMENTS

Hereinafter, a preferred embodiment of a spectrometry device and a spectrometry method according to an aspect of the present disclosure will be described in detail with reference to the accompanying drawings.

Figure 1:
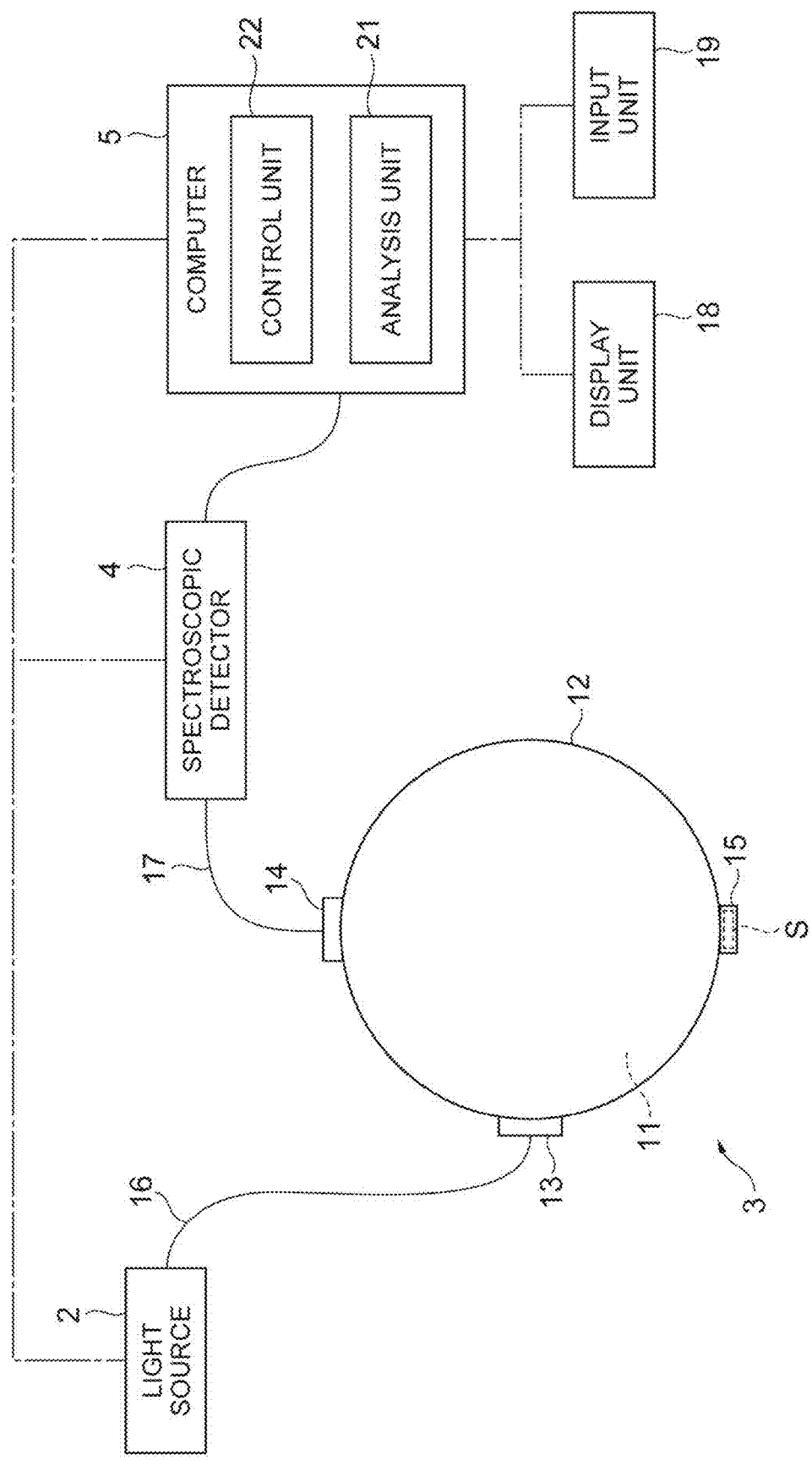
FIG. 1 is a schematic diagram illustrating an embodiment of a spectrometry device.

FIG. 1 is a schematic diagram illustrating an embodiment of a spectrometry device. As shown in the drawing, a spectrometry device 1 includes a light source 2, an integrator 3, a spectroscopic detector 4, and a computer 5. This spectrometry device 1 is configured as a device that measures the photoluminescence quantum yield of a light-emitting material. The light-emitting material which is an object to be measured is a long afterglow emission material such as a luminescent material or a phosphorescent material. The long afterglow emission material is, for example, a material that accumulates sunlight or excitation light of a fluorescent lamp or the like, and sustains light emission for a constant period of time even after radiation of the excitation light is stopped. Examples of the long afterglow emission material include an inorganic material or an organic material containing a rare metal, and the like. The form of the long afterglow emission material can variously be a solution, a thin film, a powder, or the like.

The light source 2 is a device that outputs excitation light. The excitation light which is output from the light source 2 is light having a wavelength that excites a long afterglow emission material and expresses light emission. The light source 2 is, for example, a monochrome light source having a monochromator attached to a xenon lamp. The light source 2 may be constituted by a laser diode that outputs a laser beam having a wavelength corresponding to the absorption wavelength of a long afterglow emission material. The light source 2 may be a wavelength variable light source. The light source 2 may include an ND filter, a relay optical system, a shutter, or the like. The light source 2 may be configured to be capable of outputting standard light for performing calibration of the sensitivity of the entire device.

The integrator 3 includes a main body 12 provided with an internal space 11 in which a long afterglow emission material S is disposed, an input unit 13 that inputs excitation light which is output from the light source 2 to the internal space 11, and an output unit 14 that outputs light from the internal space 11 to the outside. In the present embodiment, the integrator 3 is an integrating sphere, and the main body 12 and the internal space 11 are formed in a sphere shape. The spherical portion of the inner wall of the main body 12 is formed as a wall surface having high reflectance and excellent diffusibility, and its planar portion is formed as a flat mirror having high reflectance.

The main body 12 is provided with a sample attachment portion 15. A holding container for holding the long afterglow emission material S is attached to the sample attachment portion 15. For example, in a case where the long afterglow emission material S is a liquid, a cell for a solution sample formed of a transparent material (such as, for example, silica glass or plastic) that transmits light, or the like is attached to the sample attachment portion 15 as a sample container. In addition, in a case where the long afterglow emission material S is a solid such as a powder or a thin film, a cell for a solid sample formed of a transparent material (such as, for example, silica glass or plastic) that transmits light, or a metal, or the like is attached to the sample attachment portion 15 as a sample container.

Meanwhile, the long afterglow emission material S may not necessarily be completely disposed within the internal space 11 of the integrator 3, or a portion of the long afterglow emission material S may be disposed in the internal space 11 of the integrator 3. For example, using an optical attachment attached to the sample attachment portion 15, a sample disposed outside the inner wall of the integrator 3 may be optically disposed in the internal space 11 of the integrator 3.

The input unit 13 inputs excitation light to the internal space 11. The input unit 13 is optically connected to the light source 2 through a light guide for input 16. As the light guide for input 16, for example, an optical fiber or the like can be used. In addition, the output unit 14 outputs light from the internal space 11. The output unit 14 is optically connected to the spectroscopic detector 4 through a light guide for output 17. As the light guide for output 17, for example, an optical fiber or the like can be used.

In the integrator 3, the excitation light from the light source 2 is input from the input unit 13 to the internal space 11, and the excitation light is reflected within the internal space 11 in a multiplex diffusion manner. In addition, in the integrator 3, light emitted by the excitation light being radiated to the long afterglow emission material S is reflected within the internal space 11 in a multiplex diffusion manner. The excitation light and the emitted light reflected within the internal space 11 in a multiplex diffusion manner are input, as detection light, from the output unit 14 to the spectroscopic detector 4.

The spectroscopic detector 4 spectroscopically disperses detection light which is output from the integrator 3, and acquires spectral data. The spectroscopic detector 4 spectroscopically disperses the detection light into individual wavelength components using a spectroscopic element such as, for example, a grating or a prism, and detects the intensity of the spectroscopically dispersed light of each wavelength using an optical sensor group. The optical sensor group is configured by, for example, a plurality of light receiving units being arranged one-dimensionally. The optical sensor group detects the intensity of light having each wavelength component using a light receiving unit corresponding to each wavelength, and acquires spectral data of the excitation light and the emitted light. The spectroscopic detector 4 outputs the acquired spectral data to the computer 5.

Examples of an optical sensor of the spectroscopic detector 4 to be used include a CCD linear image sensor and a CMOS linear image sensor formed on a silicon substrate. These sensors are sensitive to light having, for example, a wavelength of 360 nm to 1,100 nm. In addition, examples of the optical sensor of the spectroscopic detector 4 include an InGaAs linear image sensor. This sensor is sensitive to light having, for example, a wavelength of 900 nm to 1,650 nm. The spectroscopic detector 4 can make the exposure time of the detection light set variable, and changes the exposure time during measurement on the basis of predetermined conditions (which will be described later).

The computer 5 is configured to include a memory such as, for example, a RAM or a ROM, a processor (an arithmetic circuit) such as a CPU, a communication interface, and a storage unit such as a hard disk. Examples of such a computer 5 include a personal computer, a microcomputer, a cloud server, a smart device (such as a smartphone or a tablet terminal), and the like. In addition, the computer 5 includes a display unit 18 such as a monitor, a keyboard, and an input unit 19 such as a mouse.

The computer 5 functions as an analysis unit 21 and a control unit 22 by executing a program stored in a memory in a CPU of a computer system. The analysis unit 21 analyzes the photoluminescence quantum yield of the long afterglow emission material S on the basis of the spectral data of the excitation light and the emitted light acquired by the spectroscopic detector 4. The control unit 22 executes control of the light source 2 and the spectroscopic detector 4. The control unit 22 controls an operation of the light source 2, and performs switching between the presence and absence of input of the excitation light to the internal space 11. In addition, the control unit 22 controls the spectroscopic detector 4, and controls the exposure time of the detection light in the spectroscopic detector 4. The details of control will be described later.

Next, a method of measuring a photoluminescence quantum yield of the long afterglow emission material S using the above-described the spectrometry device 1 will be described.

In this measuring method, the reference measurement and the sample measurement described above are performed. The sample measurement is configured to include a spectral data acquisition step (step S01) and a photoluminescence quantum yield analysis step (step S02). The spectral data acquisition step is a step of spectroscopically dispersing detection light, output from the integrator 3 having the internal space 11 in which the long afterglow emission material S is disposed, through the spectroscopic detector 4 and acquiring spectral data. The photoluminescence quantum yield analysis step is a step of analyzing the photoluminescence quantum yield of the long afterglow emission material S on the basis of the spectral data.

The photoluminescence quantum yield is one evaluation item of a light-emitting material, and is a value indicating the light emission efficiency of the light-emitting material. Generally, in a case where excitation light is absorbed into a light-emitting material, light emission such as fluorescence or phosphorescence and heat dissipation caused by no radiation transition are performed. A photoluminescence quantum yield $\Phi_{PL}$ indicates the degree of this light emission, and is calculated by dividing the number of photons $N_L$ emitted from a light-emitting material by the number of photons $N_A$ absorbed into the light-emitting material.

Figure 2:
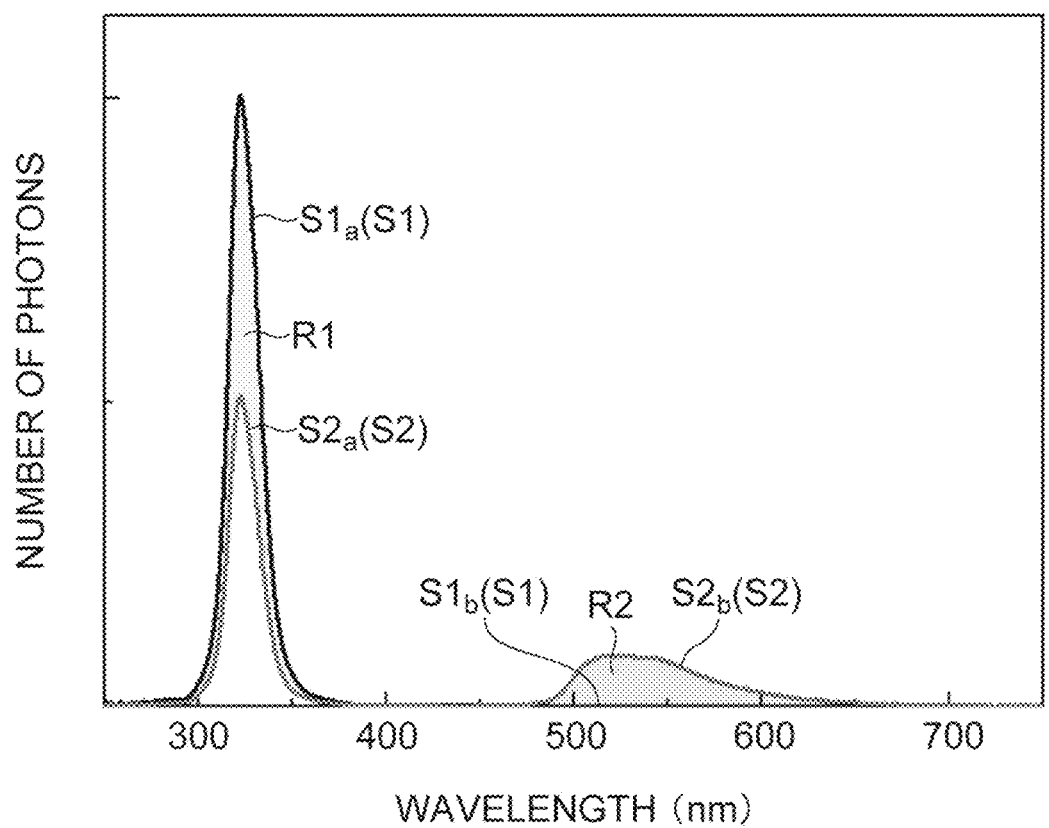
FIG. 2 is a diagram illustrating a principle of calculation of a photoluminescence quantum yield.

FIG. 2 is a diagram illustrating a principle of calculation of a photoluminescence quantum yield. In the drawing, the horizontal axis represents a wavelength, the vertical axis represents an intensity, and a spectrum S1 during the reference measurement and a spectrum S2 during the sample measurement are plotted. The reference measurement is a step of acquiring spectral data of detection light without disposing the long afterglow emission material S in the internal space 11 of the integrator 3. In the reference measurement, excitation light is continuously input to the integrator 3 during the measurement. The spectrum S1 which is obtained in the reference measurement corresponds to the spectral data of the excitation light which is output from the light source 2.

The sample measurement is a step of disposing the long afterglow emission material S in the internal space 11 of the integrator 3 and acquiring the spectral data of detection light. In the sample measurement, the excitation light is input to the integrator 3 over a constant period of time from the start of the measurement, and output of the excitation light is stopped after an elapse of a certain period of time. Thereafter, the measurement is ended at a point in time when light emission of the long afterglow emission material S exceeds a threshold and attenuates.

A spectrum $S1_a$ appearing on a short wavelength side (here, approximately 300 nm to 400 nm) in the spectrum S1 which is obtained in the reference measurement is equivalent to a component of the excitation light. A spectrum $S1_b$ appearing at a wavelength region (here, approximately 480 nm to 650 nm) different from the spectrum $S1_a$ in the spectrum S1 which is obtained in the reference measurement is equivalent to a component of the excitation light (or background light) in the detection light. A spectrum $S2_a$ appearing at a wavelength region corresponding to the spectrum $S1_a$ in the spectrum S2 which is obtained in the sample measurement corresponds to spectral data of the component of the excitation light in the detection light. A spectrum $S2_b$ appearing at a wavelength region corresponding to the spectrum $S1_b$ in the spectrum S2 which is obtained in the sample measurement corresponds to spectral data of a component of emitted light in the detection light. Therefore, the number of photons $N_A$ absorbed into the light-emitting material is calculated on the basis of a region R1 obtained by deducting the spectrum $S2_a$ from the spectrum $S1_a$, and the number of photons $N_L$ emitted from the light-emitting material is calculated on the basis of a region R2 obtained by deducting the spectrum $S1_b$ from the spectrum $S2_b$.

Figure 3:
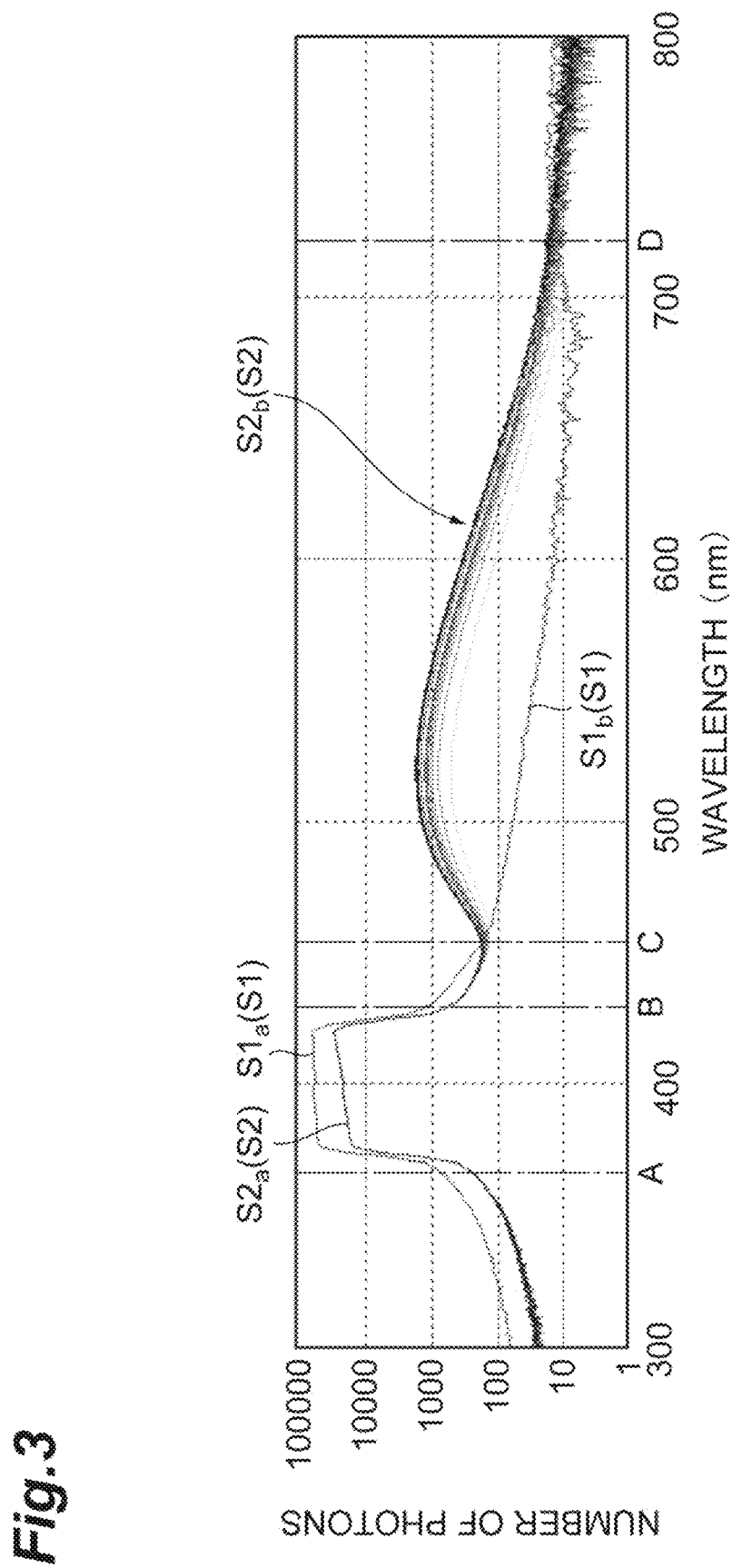
FIG. 3 is a diagram illustrating a temporal variation in the intensity of light emission in a long afterglow emission material.

In a case where the long afterglow emission material S is a measurement target, there is a problem in that the intensity of light emission in the long afterglow emission material S is extremely (approximately one figure) weaker than the intensity of the excitation light, and that the intensity of light emission after the radiation of the excitation light is stopped fluctuates over time. For example, FIG. 3 is a diagram in which the spectrum S1 obtained in the reference measurement and a plurality of spectra S2 obtained by performing the sample measurement multiple times at constant time intervals are plotted. In the case of a normal light-emitting material, there is little fluctuation in a portion equivalent to the spectrum $S2_b$ even in a case where the sample measurement is performed multiple times, but in the result of FIG. 3 for the long afterglow emission material S, the number of photons indicated by the spectrum $S2_b$ increases whenever the sample measurement is performed. Therefore, it can be understood that the photoluminescence quantum yield of the long afterglow emission material S in this case gradually increases over time.

In measuring the photoluminescence quantum yield of such a long afterglow emission material S, in a measurement method of the related art, the exposure time of the detection light in the spectroscopic detector is set to be constant throughout the entire period from the start of measurement to the end of measurement. This exposure time is set to a short time of, for example, approximately several tens of msec in order to avoid the saturation of a signal in the spectroscopic detector due to the excitation light. However, when the detection light is detected at the same exposure time even after output of the excitation light is stopped, there may be a problem in that the S/N ratio of detection to light emission of the long afterglow emission material S decreases, and the accuracy of measurement of the photoluminescence quantum yield is not sufficiently obtained.

Figure 4:
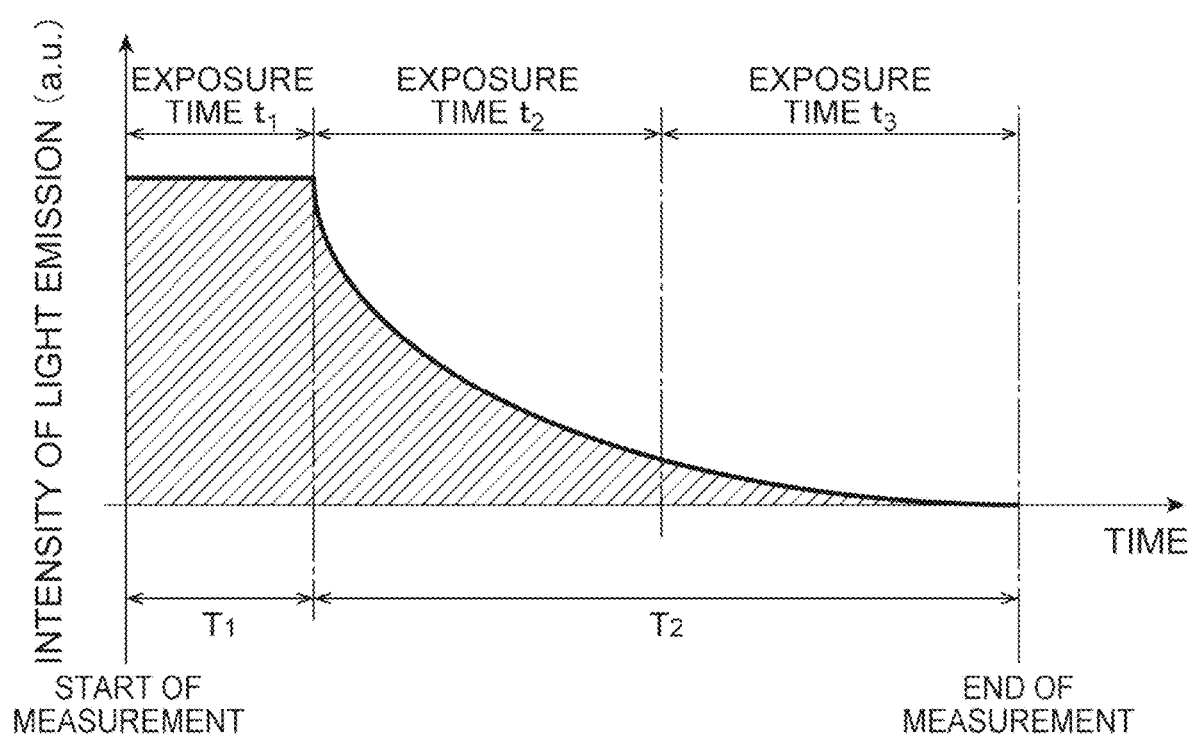
FIG. 4 is a diagram illustrating an example of a time profile of the intensity of light emission in the long afterglow emission material and control of exposure times of detection light.

On the other hand, in the measurement method using the spectrometry device 1 according to the present embodiment, control of switching between turning on and turning off of the light source 2 by the control unit 22 and control of the exposure time of detection light in the spectroscopic detector 4 are executed in the spectral data acquisition step. FIG. 4 is a diagram illustrating an example of a time profile of the intensity of light emission in the long afterglow emission material and control of exposure times of the detection light. In the spectral data acquisition step, as shown in FIG. 4, a first period $T_1$ is started with the start of output of the excitation light by the light source 2, and the acquisition of spectral data of the detection light in the spectroscopic detector 4 is started. During the first period $T_1$, input of the excitation light to the internal space 11 is maintained, and the excitation light continues to be radiated to the long afterglow emission material S. Thereby, the long afterglow emission material S is excited, and light emission is started. In the first period $T_1$, light emission of the long afterglow emission material S increases and then converges on a constant peak intensity. In addition, the exposure time of the detection light in the spectroscopic detector 4 is set to a shortest exposure time $t_1$ throughout the entire measurement period so that saturation of a signal in the spectroscopic detector 4 does not occur. In the example of FIG. 4, the exposure time $t_1$ is set to, for example, 20 msec.

In a second period $T_2$ subsequent to the first period $T_1$, output of the excitation light by the light source 2 is stopped. In the second period $T_2$, the incidence of the excitation light on the long afterglow emission material S is stopped, but light emission of the long afterglow emission material S in which the excitation light is accumulated is sustained for a constant period of time while gradually attenuating. The timing of the start of the second period $T_2$ is determined on the basis of, for example, the peak value of the intensity of light emission. In this case, the intensity of light emission during the first period $T_1$ is monitored by the spectroscopic detector 4, and output of the excitation light from the light source 2 is stopped in a case where a fluctuation per unit time in the peak value of the intensity of light emission is set to be equal to or less than a threshold (for example, 1%).

In addition, in the second period $T_2$, the exposure time of the detection light in the spectroscopic detector 4 is set to an exposure time $t_2$ longer than the exposure time $t_1$ in the first period $T_1$. The exposure time $t_2$ may be determined by integrating any constant with the exposure time $t_1$. In addition, the exposure time $t_2$ may be determined using the ratio of the peak value of the intensity of the excitation light to the peak value of the intensity of light emission. In this case, the peak value of the intensity of the excitation light and the peak value of the intensity of light emission during the first period $T_1$ are monitored by the spectroscopic detector 4 (peak acquisition step), a ratio is calculated by dividing the peak value of the intensity of the excitation light by the peak value of the intensity of light emission. The exposure time $t_2$ is determined by integrating the calculated ratio with the exposure time $t_1$. For example, in a case where the exposure time $t_1$ is 20 msec, and the ratio is 10, the exposure time $t_2$ is set to 200 msec. When the ratio is calculated, it is preferable that a value after the intensity is stabilized is used as the peak value of the intensity of light emission.

The exposure time $t_2$ of the detection light in the second period $T_2$ may be maintained until the end of measurement, but the spectroscopic detector 4 may be controlled so that the exposure time of the detection light becomes longer after an elapse of a certain period of time from the start of the second period $T_2$. In this case, when the threshold of the intensity of light emission is set in advance, and the intensity of light emission in the second period $T_2$ attenuates and is set to be equal to or less than the threshold, the exposure time of the detection light is set to an exposure time $t_3$ longer than the exposure time $t_2$. There is no particular limitation to the value of the exposure time $t_3$, but the exposure time $t_3$ may be determined by integrating, for example, the exposure time $t_2$ with any coefficient. For example, in a case where the exposure time $t_2$ is 200 msec, and the coefficient is 10, the exposure time $t_2$ is set to 2,000 msec.

In addition, in the photoluminescence quantum yield analysis step, in analyzing the time profile of the intensity of light emission in the long afterglow emission material S, the intensity of light emission in the long afterglow emission material S in the first period $T_1$ is standardized on the basis of the exposure time $t_1$ of the detection light in the first period $T_1$. In addition, the intensity of light emission in the long afterglow emission material S in the second period $T_2$ is standardized on the basis of the exposure time $t_2$ of the detection light in the second period $T_2$. In a case where the exposure period is set from the exposure time $t_2$ to the exposure time $t_3$ after an elapse of a certain period of time in the second period $T_2$, a period after the set time is standardized on the basis of the exposure time $t_3$.

Figure 5:
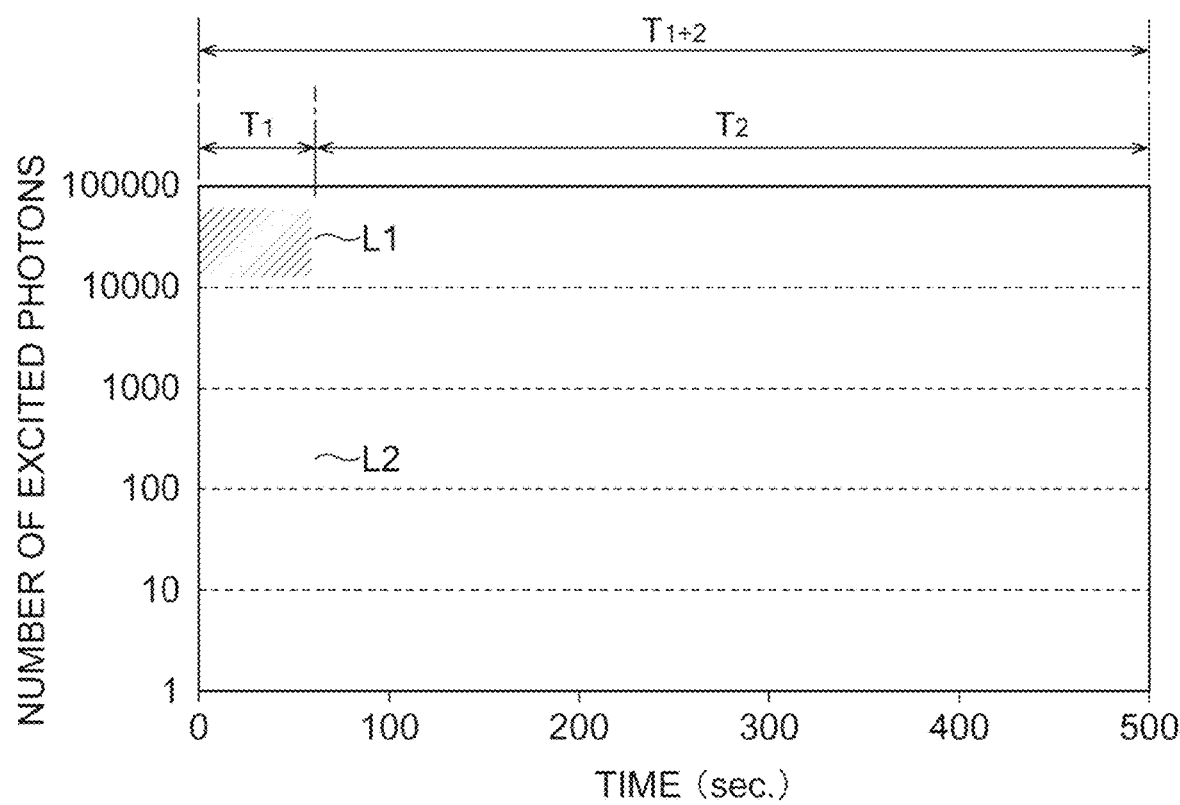
FIG. 5 is a diagram illustrating an example of calculation of the number of absorbed photons of the long afterglow emission material.

Meanwhile, in the photoluminescence quantum yield analysis step, in calculating the photoluminescence quantum yield of the long afterglow emission material S on the basis of the time profile of the intensity of light emission in the long afterglow emission material S, the number of absorbed photons of the long afterglow emission material S may be obtained on the basis of excitation light spectral data in the first period $T_1$. In this case, regarding the calculation of the number of absorbed photons, specifically, an extraction window (A-B in FIG. 3) is first set with respect to the spectrum S1 during the reference measurement and the spectrum S2 during the sample measurement which are represented by the wavelength axis, and as shown in FIG. 5, excitation light spectral data L1 during the reference measurement and excitation light spectral data L2 during the sample measurement are acquired with respect to the time axis. Next, the integrated value of the number of photons of the excitation light spectral data L2 in the first period $T_1$ is subtracted from the integrated value of the number of photons of the excitation light spectral data L1 in the first period $T_1$, and the number of absorbed photons of the long afterglow emission material S is obtained.

Figure 6:
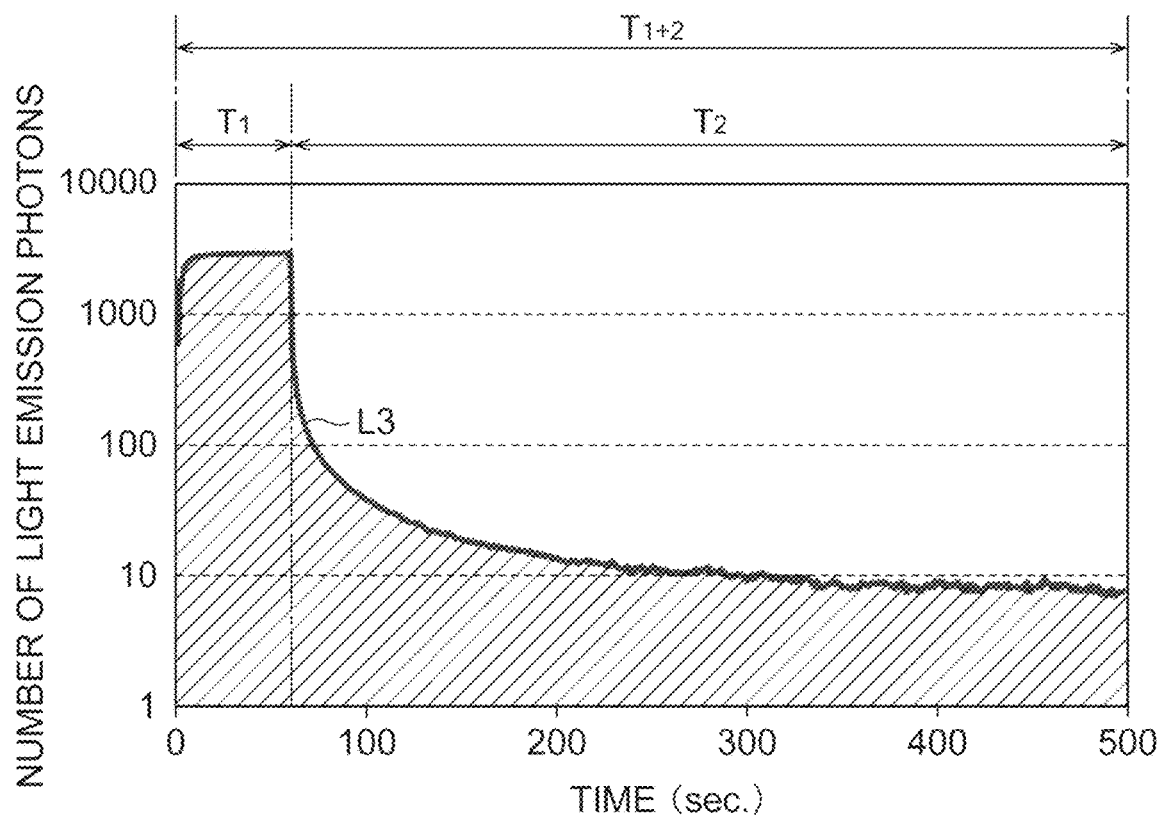
FIG. 6 is a diagram illustrating an example of calculation of the number of light emission photons in the long afterglow emission material.

In addition, in the photoluminescence quantum yield analysis step, in calculating the photoluminescence quantum yield of the long afterglow emission material S on the basis of the time profile of the intensity of light emission in the long afterglow emission material S, the number of light emission photons of the long afterglow emission material S may be obtained on the basis of light emission spectral data in any of 1) the first period $T_1$, 2) the second period $T_2$, and 3) a total period $T_{1+2}$ of the first period $T_1$ and the second period $T_2$. In this case, regarding the calculation of the number of light emission photons, specifically, an extraction window (C-D in FIG. 3) is first set with respect to the spectrum S2 during the sample measurement represented by the wavelength axis. As shown in FIG. 6, the number of light emission photons is obtained by light emission spectral data L3 which is obtained by subtracting the number of photons of the excitation light (reference measurement result) from light emission photons (sample measurement result) in the extraction window C-D. Finally, the photoluminescence quantum yield of the long afterglow emission material S is calculated by dividing the number of light emission photons by the number of absorbed photons.

As described above, in the spectrometry device 1, the excitation light is continuously input to the long afterglow emission material S within the integrator 3 in the first period $T_1$ in which the acquisition of spectral data is started. The intensity of the excitation light is extremely higher than the intensity of light emission in the long afterglow emission material S. For this reason, the exposure time $t_1$ of the detection light in the first period $T_1$ is made shorter than the exposure time $t_2$ of the detection light in the second period $T_2$, whereby it is possible to prevent the saturation of a signal in the spectroscopic detector 4. In addition, in the spectrometry device 1, the input of the excitation light to the long afterglow emission material S within the integrator 3 is stopped in the second period $T_2$ subsequent to the first period $T_1$, and the exposure time $t_2$ of the detection light in the second period $T_2$ is made longer than the exposure time $t_1$ of the detection light in the first period $T_1$. Thereby, light emission of the long afterglow emission material S in which its intensity is extremely lower than the excitation light and the intensity fluctuates over time after the input of the excitation light is stopped can be detected with a sufficient S/N ratio. Therefore, in the spectrometry device 1, it is possible to measure the photoluminescence quantum yield of the long afterglow emission material S with a good degree of accuracy. In addition, the exposure time $t_2$ is made longer than the exposure time $t_1$, so that even in a case where the emission lifetime of the long afterglow emission material is long, it is possible to suppress an increase in the amount of data required for the acquisition of spectral data.

In addition, in the spectrometry device 1, the control unit 22 can control the spectroscopic detector 4 so that the exposure time of the detection light becomes longer after an elapse of a certain period of time from the start of the second period $T_2$. Thereby, it is possible to more suitably suppress an increase in the amount of data required for the acquisition of spectral data.

In addition, in the spectrometry device 1, the spectroscopic detector 4 acquires the peak value of the intensity of the excitation light in the first period $T_1$ and the peak value of the intensity of light emission in the long afterglow emission material S on the basis of the spectral data, and the control unit 22 determines the exposure time $t_2$ of the detection light during the start of the second period $T_2$ on the basis of the product of the ratio of the peak value of the intensity of the excitation light to the peak value of the intensity of light emission and the exposure time $t_1$ of the detection light in the first period $T_1$. By using such a ratio, it is possible to optimize the exposure time $t_2$ of the detection light during the start of the second period $T_2$, and to prevent the saturation of a signal in the spectroscopic detector 4 in the second period $T_2$.

In addition, in the spectrometry device 1, the analysis unit 21 analyzes the time profile of the intensity of light emission in the long afterglow emission material S by standardizing the intensity of light emission in the long afterglow emission material in the first period $T_1$ on the basis of the exposure time $t_1$ of the detection light in the first period $T_1$, and standardizing the intensity of light emission in the long afterglow emission material in the second period $T_2$ on the basis of the exposure time $t_2$ of the detection light in the second period $T_2$. Thereby, even in a case where the exposure time is dynamically changed during a measurement period, it is possible to analyze the time profile of the intensity of light emission in the long afterglow emission material S with a good degree of accuracy.

Figure 7:
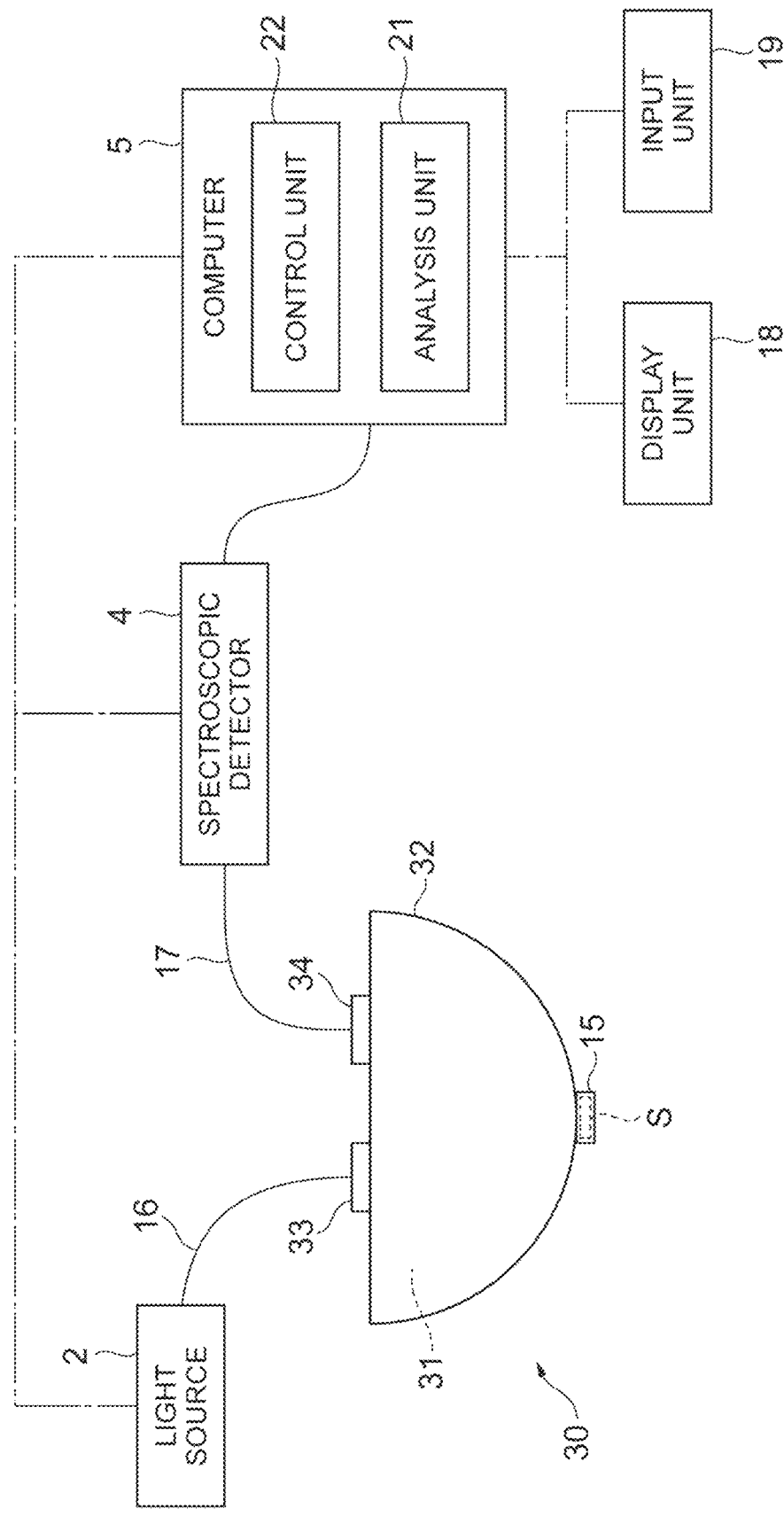
FIG. 7 is a schematic diagram illustrating another embodiment of the spectrometry device.

Meanwhile, in the above embodiment, the integrator 3 constituted by an integrating sphere is used as shown in FIG. 1, but an integrator 30 constituted by an integration hemisphere may be used as shown in FIG. 7. A main body 32 and an internal space 31 of this integrator 30 are formed in a hemisphere shape. The spherical portion of the inner wall of the main body 12 is formed as a wall surface having high reflectance and excellent diffusibility, and its planar portion is formed as a flat mirror having high reflectance. An input unit 33 and an output unit 34 may be provided at any position of the spherical portion and the planar portion. Even in a case where an integration hemisphere is used as the integrator 30 in this manner, it is possible to measure the photoluminescence quantum yield of the long afterglow emission material S with a good degree of accuracy.

REFERENCE SIGNS LIST

1 Spectrometry device,
2 Light source,
3, 30 Integrator,
4 Spectroscopic detector,
11 Internal space,
21 Analysis unit,
22 Control unit,
S Long afterglow emission material,
$T_1$ First period,
$T_2$ Second period,
$t_1$ Exposure time in first period,
$t_2$ Exposure time in second period

The invention claimed is:

1. A spectrometry device configured to irradiate a long afterglow emission material with excitation light and measure a photoluminescence quantum yield, the device comprising:

a light source configured to output the excitation light;
an integrator configured to have an internal space in which the long afterglow emission material is disposed, and output light from the internal space as detection light;
a spectroscopic detector configured to spectroscopically disperse the detection light and acquire spectral data;
an analyzer configured to analyze the photoluminescence quantum yield of the long afterglow emission material on the basis of the spectral data; and
a controller configured to control switching between presence and absence of input of the excitation light to the internal space and an exposure time of the detection light in the spectroscopic detector,
wherein the controller
controls the light source so that the input of the excitation light to the internal space is maintained in a first period in which the acquisition of the spectral data through the spectroscopic detector is started, and that the input of the excitation light to the internal space is stopped in a second period subsequent to the first period, and
controls the spectroscopic detector so that an exposure time of the detection light in the second period becomes longer than an exposure time of the detection light in the first period,
wherein the detection light and the spectral data contain a component having a longer wavelength than the excitation light,
wherein the first period is one during which input of the excitation light into the internal space is maintained, and the second period is one during which input of the excitation light into the internal space is stopped, wherein the start timing of the second period is determined based on the fluctuation per unit time of a peak value of intensity of light emission, wherein the spectroscopic detector acquires a peak value of an intensity of the excitation light in the first period and the peak value of the intensity of light emission in the long afterglow emission material on the basis of the spectral data, and the controller determines an exposure time of the detection light during start of the second period on the basis of a product of a ratio of the peak value of the intensity of the excitation light to the peak value of the intensity of light emission and the exposure time of the detection light in the first period.

2. A spectrometry method of irradiating a long afterglow emission material with excitation light and measuring a photoluminescence quantum yield, the method comprising:

acquiring spectroscopically dispersing detection light, output from a n integrator having an internal space in which the long afterglow emission material is disposed, through a spectroscopic detector and acquiring spectral data; and analyzing the photoluminescence quantum yield of the long afterglow emission material on the basis of the spectral data, wherein, in the acquiring, input of the excitation light to the internal space is maintained in a first period in which the acquisition of the spectral data through the spectroscopic detector is started, and the input of the excitation light to the internal space is stopped in a second period subsequent to the first period, and an exposure time of the detection light in the second period in the spectroscopic detector is made longer than an exposure time of the detection light in the first period, wherein the detection light and the spectral data contain a component having a longer wavelength than the excitation light, wherein the first period is one during which input of the excitation light into the internal space is maintained, and the second period is one during which input of the excitation light into the internal space is stopped, and wherein the start timing of the second period is determined based on the fluctuation per unit time of a peak value of intensity of light emission, further comprising acquiring a peak value of an intensity of the excitation light in the first period and the peak value of the intensity of light emission in the long afterglow emission material on the basis of the spectral data, wherein, in the peak acquiring, an exposure time of the detection light during start of the second period is determined on the basis of a product of a ratio of the peak value of the intensity of the excitation light to the peak value of the intensity of light emission and the exposure time of the detection light in the first period.

* * * * *